United States Patent [19]

Laurienzo

[11] Patent Number: 5,043,720

[45] Date of Patent: Aug. 27, 1991

[54] KEYLESS ACCESS CONTROL SYSTEM

[76] Inventor: Paul G. Laurienzo, 1320 Cranston St., Cranston, R.I. 02920

[21] Appl. No.: 513,081

[22] Filed: Apr. 23, 1990

[51] Int. Cl.[5] ............................................ H04Q 3/00

[52] U.S. Cl. ............................ 340/825.32; 340/528; 70/278

[58] Field of Search ..................... 340/825.32, 825.31, 340/528, 541, 542; 70/278; 361/172

[56] References Cited

U.S. PATENT DOCUMENTS

| | | | |
|---|---|---|---|
| 3,633,167 | 1/1972 | Hedin | 340/825.32 |
| 3,881,171 | 4/1975 | Moorman et al. | 340/825.32 |
| 4,021,796 | 5/1977 | Fawcett, Jr. et al. | 340/825.32 |
| 4,114,147 | 9/1978 | Hile | 340/528 |

*Primary Examiner*—Donald J. Yusko

*Assistant Examiner*—Edwin C. Holloway, III

*Attorney, Agent, or Firm*—Barlow & Barlow Ltd.

[57] ABSTRACT

An electronic control system for electrically operated keyless locks utilizes a matrix keyboard to supply signals to a digital lock circuit for operating a duress alarm relay circuit, a lock release delay relay circuit, an alarm shunt delay relay circuit and a tamper disable circuit. The lock release delay relay circuit and alarm shunt delay relay circuit operate off of the same signal from the digital lock circuit for differing predetermined periods of time. The tamper disable circuit upon receipt of an invalid code from the matrix keyboard inhibits further operation of the lock release delay relay circuit and the alarm shunt relay circuit for a predetermined period of time. The duress alarm relay circuit operates off of a different signal from the digital lock circuit than the other circuits and is not affected by their operation.

7 Claims, 2 Drawing Sheets

KEYLESS ACCESS CONTROL SYSTEM

BACKGROUND OF THE INVENTION (1) Field of the Invention

The present invention relates to a keyless electronic security system for operation of locks. More particularly the system provides a multitude of functions including means for easily accessing an electrically operated lock for those authorized entrance while inhibiting access to unauthorized personnel.

(2) Description of the Prior Art

There are various prior art control systems for electrically operated locks. These vary from simplified pushbutton arrangements to ones in which a preselected code must be actuated with various adjustable time delays and alarms dependent on the validity of previous codes entered.

SUMMARY OF THE INVENTION

Accordingly, it is a general purpose and object of the present invention to provide an improved electronic control system for electrically operated keyless locks. It is a further object that upon initiation of unlocking that access is provided for only a predetermined period of time. It is a further object to provide a simplified system in which an intruder without knowledge of the coded signals would tend to be frustrated from obtaining entrance to a secured area by randomly or sequentially accessing the selected code. It is a further object to enable one to provide a duress signal in place of the access signal through the same input device.

These objects are accomplished with the present invention by providing a system in which an operator using the same input device can provide a lock release signal for a predetermined period of time or a duress signal. The invention further inhibits access signals from being recognized for a predetermined period of time after an erroneous signal is entered. However, during the time in which access signals are inhibited from being recognized a duress signal from the same input device is recognized.

DESCRIPTION OF THE PREFERRED EMBODIMENT

Figure 1:
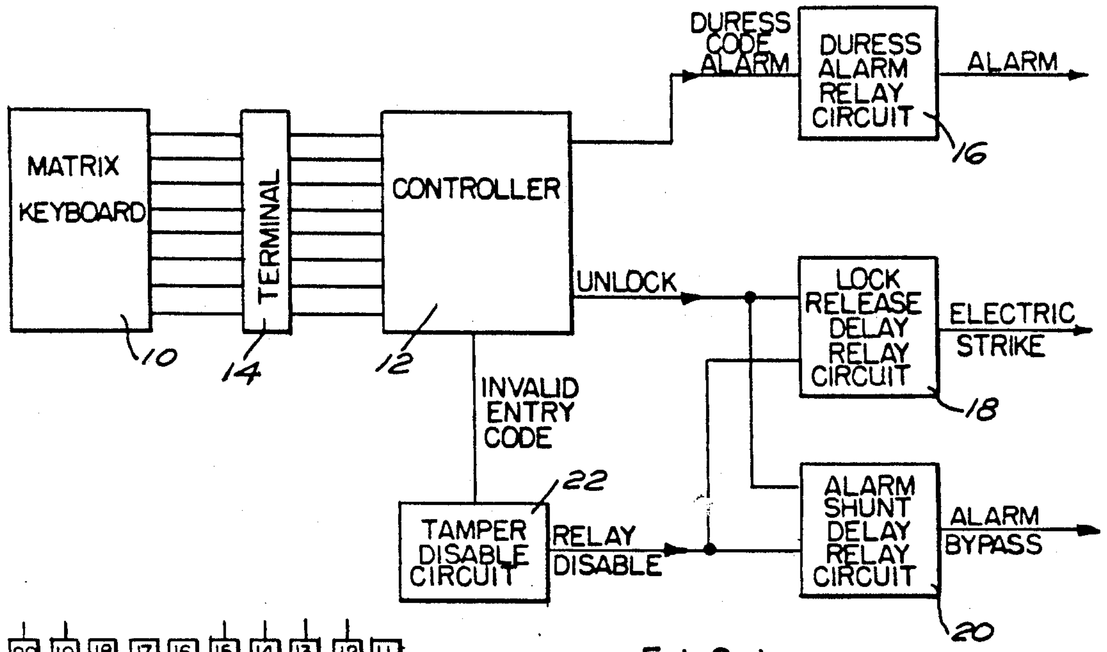
FIG. 1 is a block diagram of the keyless access control system of the present invention.

Referring now to FIG. 1 there is shown a block diagram of a keyless lock control system permitting access only to authorized personnel. A matrix keyboard 10 is hardwired to a controller 12 via a terminal board 14. Dependent upon the code received from the matrix keyboard 10 the controller 12 is capable of providing any of a multitude of signals.

One such programmed code received at controller 12 from the matrix keyboard 10 provides a duress code alarm signal to a duress alarm relay circuit 16 that is connected for actuating an external alarm circuit. Another programmed code is a valid entry code received at controller 12 from the matrix keyboard 10. It provides an unlock signal for electric strike (door lock release) and alarm bypass through operation of lock release delay relay circuit 18 and alarm shunt delay relay circuit 20 for fixed periods of time. In the present case the time period is selected at three seconds for the door lock release operation and thirty seconds for the door alarm bypass operation. A code received at controller 12 that differs from a programmed code is an invalid code. An invalid code received at controller 12 from the matrix keyboard 10 initiates an invalid entry code signal to a tamper disable circuit 22 that forwards a relay disable signal inhibiting both the lock release delay relay circuit 18 and the alarm shunt delay relay circuit 20 from providing the aforementioned door lock release and door alarm bypass for a fixed period of time. In the present case the time period is selected at twelve seconds. This means that if an invalid code is initiated at the matrix keyboard 10, a time period of twelve seconds must elapse before the system accepts the next unlock signal. This inhibits one without knowledge of the access code from greatly enhancing the chance of entry through rapid random or sequential choices of code.

Figure 2:
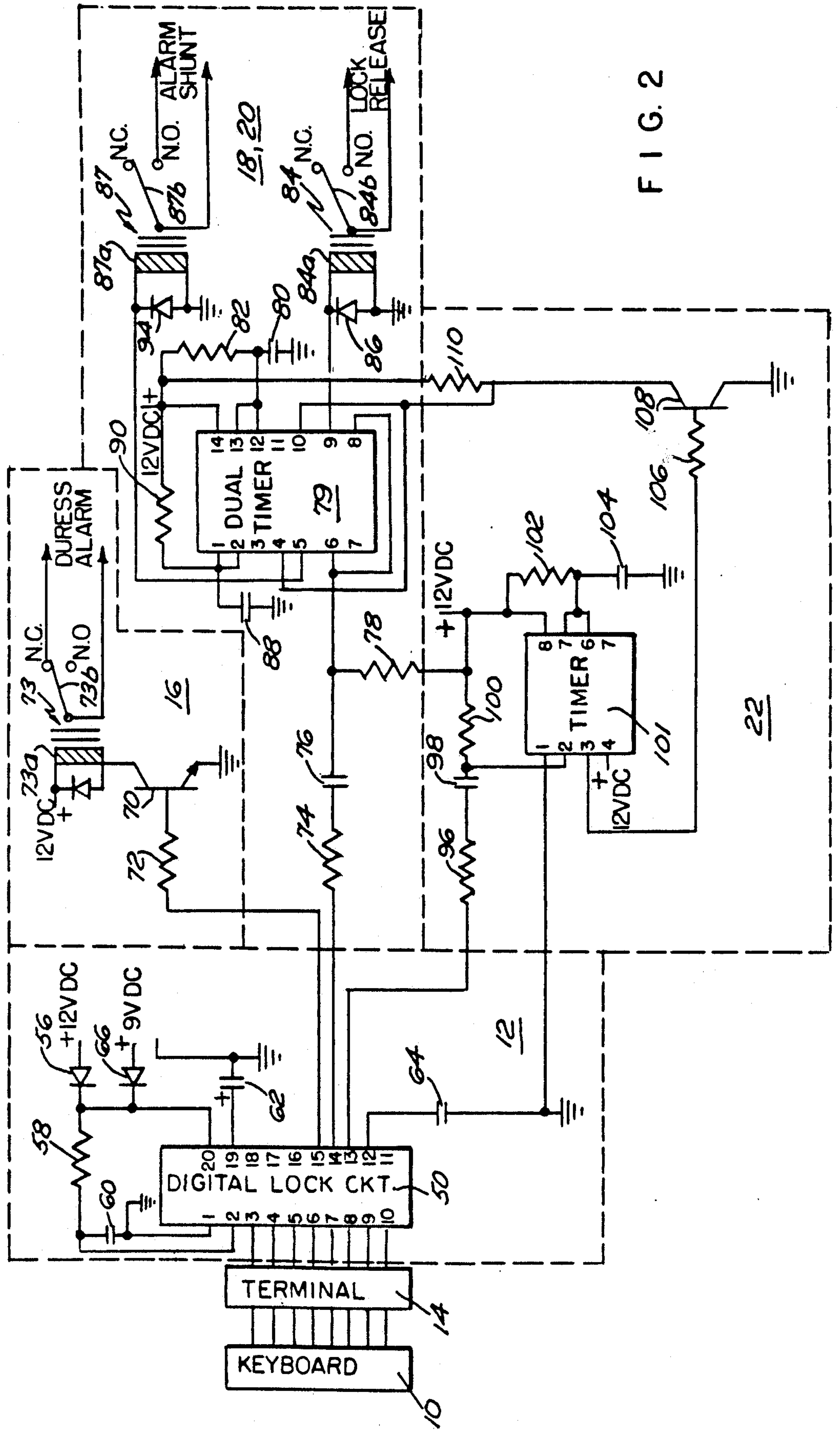
FIG. 2 is a schematic representation of the block diagram of FIG. 1.

Refer now to the schematic diagram of FIG. 2. All components shown are commercially available state-of-the-art components. There is shown the matrix keyboard 10 connected to the controller 12 through the terminal board 14. The controller 12 comprises a digital lock circuit 50 suitable for use in keyboard programmable systems. Also included in the controller 12 circuitry are diode 56, resister 58, capacitor 60, capacitor 62, capacitor 64 and diode 66.

A +12 VDC power supply is provided to digital lock circuit 50 through diode 56 with resistor 58 and capacitor 60 connected for providing clock and keyboard debounce timing. A capacitor 62 is connected for determining the keyboard entry time. In the present system an entry time of substantially twelve seconds is selected. This is a different twelve seconds from the twelve seconds that must elapse before the system accepts the next unlock signal. The capacitor 64 determines the pulse width on the unlock and tamper outputs of digital lock circuit 50. Diode 66 provides for connection of a +9 VDC transistor memory backup for circuit 50.

The duress alarm circuit 16 comprises a transistor 70, a resistor 72, a relay 73 having a coil 73*a* and a switch 73*b*, and a diode 68 connected across the coil 73*a*. The transistor 70 is connected to ground in series with coil 73*a*. The resistor 72 is connected between the lock circuit 50 and the base of the transistor 70. A dc voltage is supplied to one side of the coil 73*a*. In operation upon entry of the duress alarm code from matrix keyboard 10 to digital lock circuit 50 a signal is supplied from lock circuit terminal 50-15 through resistor 72 to the base of transistor 70 causing the transistor 70 to conduct. This energizes the coil 73*a* by increasing the voltage drop across it. This causes the switch 73*b* to operate from its normally closed to normally open contact, thereby opening the circuit to an external duress alarm. The external duress alarm is not shown since it forms no part of the present inventive system but would obviously be connected to actuate upon opening of the switch 73*b* contact.

The lock release delay relay circuit 18 comprises a resistor 74, a capacitor 76, a resistor 78, various terminals of a dual timer 79, a capacitor 80, a resistor 82, the lock release relay 84 having a coil 84*a* and a switch 84*b*, and a diode 86 connected across the coil 84*a*. In operation an output from lock circuit terminal 50-14 through the resistor 74, capacitor 76, resistor 78 network is received by dual timer terminal 79-8. This triggers a logic high output from dual timer terminal 79-9 to coil 84*a* of relay 84. This causes the switch 84*b* to operate from its normally closed to normally open contact and thereby closes the circuit to the external lock release. The lock release is not shown since it forms no part of the present inventive system but would obviously be connected to actuate upon a conductive path being formed through the normally open contact of the switch 84*b*. The coil 84*a* then remains energized activating switch 84*b* to the normally open position for a three second duration as determined by the capacitor 80, resistor 82 combination.

Simultaneous to the operation of the lock release relay 84, an alarm shunt relay 87 is also activated. The alarm shunt relay 87 forms part of an alarm shunt delay relay circuit 20. The alarm shunt delay relay circuit 20 comprises the resistor 74, the capacitor 76, the resistor 78, various terminals of the dual timer 79, capacitor 88, resistor 90, the alarm shunt relay 87 having a coil 87*a* and a switch 87*b*, and a diode 94 connected across the coil 87*a*. The alarm shunt relay 87 has an operation similar to the lock release relay 84 but has a different time delay of thirty second time duration as determined by capacitor 88 and resistor 90. The alarm shunt relay 87 operates from the same output terminal of lock circuit 50 as the lock release relay 84. In the operation of the alarm shunt relay 87 the output from lock circuit terminal 50-14 is received by dual timer terminal 79-6 through the resistor 74, capacitor 76, resistor 78, network. This triggers an additional high output from dual timer terminal 79-5 to coil 87*a* of relay 87. This causes the switch 87*b* to transfer from the normally closed to normally open contact for a thirty second duration. The alarm device is not shown as it forms no part of the present invention but would obviously be connected to become inoperative upon a conductive path being formed through the normally open contact of switch 87*b*.

The tamper disable circuit 22 comprises a resistor 96, a capacitor 98, a resistor 100, the timer 101, a resistor 102, a capacitor 104, a resistor 106, a transistor 108 and a resistor 110. In operation, the resistor 96, capacitor 98 and resistor 100 network receive a signal from lock circuit terminal 50-13 and provide triggering of the timer 101 at the timer 101-2 terminal. Upon triggering, the timer 101 produces a high logic output at the timer 101-3 terminal. This high logic output causes transistor 108 to conduct. This conduction from the power supply through resistor 110 and transistor 108 causes a logic low at the dual timer terminals 79-10 and 79-4. This resets and disables the lock release relay 84 and the alarm shunt relay 87. In other words the logic low at dual timer terminals 79-10 and 79-4 cause the respective dual timer terminal outputs 79-9 and 79-5 to produce a logic low so that neither coil 84*a* nor 87*a* are energized. This causes switches 84*b* and 87*b* to be in their normally closed positions. This happens for a period of twelve seconds which is determined by the resistor 102, capacitor 104 connection of tamper disable circuit 22.

Figure 3:
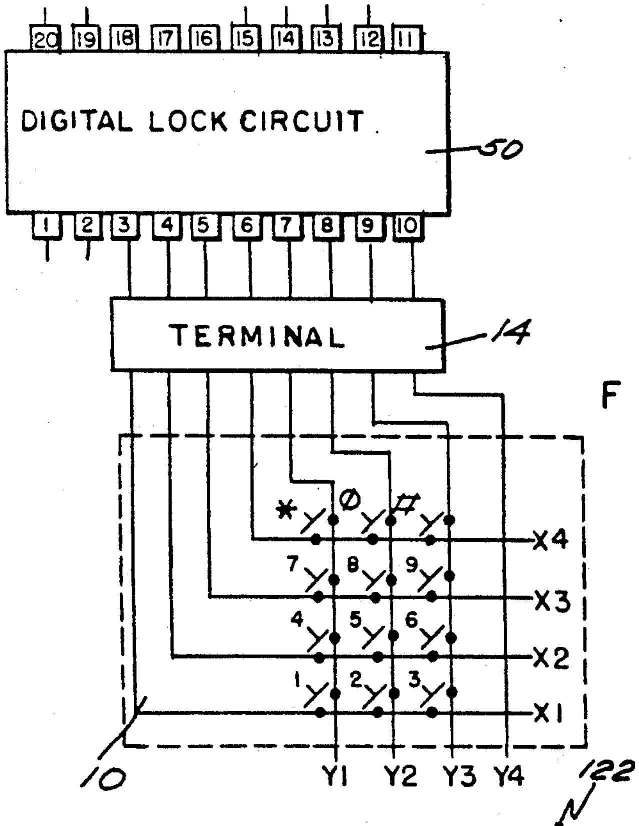
FIG. 3 shows a more detailed representation of the means for entering the digital coded signals in the keyless access control system of FIGS. 1 and 2.

FIG. 3 shows the connection of the matrix keyboard 10 to a commercially available state-of-the-art LSI Computer Systems, Inc. digital lock circuit 50 through terminal board 14. A typical sequence for providing a valid entry code is X1Y1, X1Y2, X2Y2, X2Y1. From FIG. 3 it can be seen that this would be the sequence digits 1254. This provides a high output at digital lock circuit terminal 50-14 which connects to both the lock release relay circuit 18 and the alarm shunt relay circuit 20 of FIGS. 1 and 2. A typical sequence for providing a duress code is X1Y1, X1Y2, X2Y2, X1Y1. From FIG. 3 it can be seen that this would be the sequence 1251. This provides a high output at digital lock circuit terminal 50-15 which connects to the duress alarm relay circuit 16 of FIGS. 1 and 2. The codes selected for both the entry and duress codes are alterable. This alterable process is known to those of skill in the art. In the state-of-the-art digital lock circuit 50 mentioned above the first three digits are to be the same and the fourth digit different in the entry and duress codes.

If one should provide an invalid code from matrix keyboard 10 a high output is provided by digital lock circuit terminal 50-13. This inhibits the energizing of coils 84*a* and 87*a* of FIG. 2 for a period of twelve seconds as described above in fuller detail. A valid entry code entered during this twelve seconds would be rejected by the system.

Figure 4:
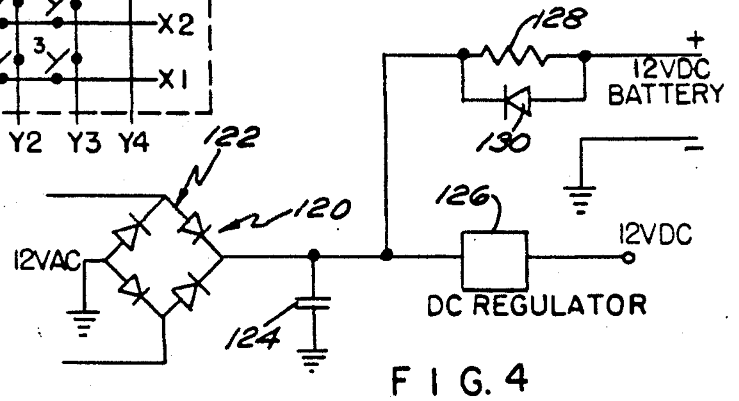
FIG. 4 shows a schematic representation of the power supply system.

Refer now to FIG. 4 for a description of the power supply for operating the system. The power supply has a rectifier regulator circuit 120 that has full wave bridge rectifier 122 connected to a capacitor 124 that is used as a low pass filter. The rectifier regulator circuit 120 receives a 12 VAC input and produces a 12 VDC output. A 12 VDC regulator 126 produces a regulated +12 VDC output to be used by the electronics of the circuit. The parallel connection of resistor 128 and diode 130 are connected to an external +12 VDC battery capable of accepting a charging rate of 80 ma. The +12 VDC power supply is connected to the various places indicated as +12 VDC in FIG. 2. In addition to the above power supplies, the diode 118 of FIG. 2 provides for connection of an external +9 VDC transistor battery. This is for the memory backup of digital lock circuit 50.

There has therefore been described a keyless access control system wherein all operations are conducted from a single keyboard. The system provides entry control and duress alarm signals. The system uses all state-of-the-art devices and provides greater economy and higher dependability than any previous system.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A keyless access control system comprising:

controller means for receiving controller means input signals and for providing output signals dependent upon said received controller means input signals;

duress alarm circuit means including a duress alarm relay, said duress alarm circuit means connected to said controller means for receiving a duress alarm circuit means input signal from said controller means upon a first predetermined controller means input signal being received by said controller means and for providing operation of said duress alarm relay upon receipt of said duress alarm circuit means input signal;

lock release circuit means and alarm shunt circuit means including respective lock release relay and alarm shunt relay, each of said lock release circuit means and said alarm shunt circuit means connected to said controller means for receiving a same lock release circuit means and alarm shunt circuit means input signal from said controller means upon a second predetermined controller means input signal being received by said controller means and for providing operation of said lock release relay for a first predetermined period of time and said alarm shunt relay for a second predetermined period of time upon receipt of said same lock release circuit means and alarm shunt circuit means input signal from said controller means, said second predetermined period of time being longer than said first predetermined period of time; and tamper disable circuit means connected to said controller means, said tamper disable circuit means for inhibiting operation of said lock release relay and said alarm shunt relay for a third predetermined period of time upon receipt of a tamper disable circuit means input signal from said controller means.

2. A keyless access control system according to claim 1 further comprising a keypad connected to said controller means for providing said controller means input signals received by said controller means.

3. A keyless access control system according to claim 1 wherein said lock release circuit means further comprises:

first timing means including a first resistor connected in series with a first capacitor, said first timing means for determining said first predetermined period of time for providing operation of said lock control relay; and lock release relay means connected to said first timing means, said lock release relay means including said lock release relay, said lock release relay means for actuating said lock release relay during said first predetermined period of time.

4. A keyless access control system according to claim 3 wherein said alarm shunt circuit means further comprises:

second timing means including a second resistor connected in series with a second capacitor, said second timing means for determining said second predetermined period of time for providing operation of said alarm shunt relay; and alarm shunt relay means connected to said second timing means, said alarm shunt relay means including said alarm shunt relay, said alarm shunt relay means for actuating said alarm shunt relay during said second predetermined period of time.

5. A keyless access control system according to claim 4 wherein said tamper disable circuit means further comprises:

a first transistor connected to said lock release circuit means and said alarm shunt circuit means; and third timing means connected to said controller means and to said first transistor, said third timing means for providing a signal to said first transistor for said third predetermined period of time upon receipt of said tamper disable circuit means input signal from said controller means, said first transistor switching to a conducting state during said third predetermined period of time thereby inhibiting operation of said lock release relay and said alarm shunt relay for said third predetermined period of time.

6. A keyless access control system according to claim 5 wherein said duress alarm circuit means further comprises a second transistor functioning as a switch connected in series with said duress alarm relay, said second transistor connected to receive said duress alarm circuit means input signal at its base, whereby said second transistor changes from a non-conducting to a conducting state upon receipt of said duress alarm circuit means input signal at its base and said duress alarm relay is energized upon said second transistor operating in said conducting state.

7. A keyless access control system according to claim 6 further comprising a keypad connected to said controller means for providing said controller means input signals received by said controller means.

* * * * *